United States Patent
Pascasio, Jr. et al.

(10) Patent No.: US 7,957,270 B2
(45) Date of Patent: Jun. 7, 2011

(54) RESILIENT PACKET RING PROTECTION OVER A WAVELENGTH DIVISION MULTIPLEXING NETWORK

(75) Inventors: Jorey M. Pascasio, Jr., San Antonio, TX (US); Patricia R. Matteson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 813 days.

(21) Appl. No.: 11/168,248

(22) Filed: Jun. 27, 2005

(65) Prior Publication Data

US 2006/0291379 A1    Dec. 28, 2006

(51) Int. Cl.
   *H04J 14/02*    (2006.01)
   *H04L 12/26*    (2006.01)
   *G06F 15/16*    (2006.01)
   *G06F 15/173*   (2006.01)

(52) U.S. Cl. .................. 370/222; 370/241.1; 370/245; 370/258; 370/403; 398/3; 398/7; 398/48; 398/59; 398/68; 709/239; 709/251

(58) Field of Classification Search .................. 370/222, 370/241.1, 245, 258, 403; 398/3, 7, 48, 59, 398/68; 709/239, 251
See application file for complete search history.

(56) References Cited

U.S. PATENT DOCUMENTS

| | | | |
|---|---|---|---|
| 6,606,667 B1 | 8/2003 | Hermann | |
| 6,813,413 B2 | 11/2004 | Bisson et al. | |
| 6,832,019 B2 | 12/2004 | Kelly | |
| 6,868,234 B1 | 3/2005 | Tammela et al. | |
| 7,126,910 B1 * | 10/2006 | Sridhar | 370/229 |
| 7,197,008 B1 * | 3/2007 | Shabtay et al. | 370/218 |
| 7,274,656 B2 * | 9/2007 | Lee et al. | 370/223 |
| 7,443,864 B1 * | 10/2008 | Johnson | 370/400 |
| 2003/0009599 A1 * | 1/2003 | Lee et al. | 709/251 |
| 2003/0026250 A1 * | 2/2003 | Fang | 370/386 |
| 2003/0112829 A1 * | 6/2003 | Sridhar | 370/522 |
| 2003/0180047 A1 | 9/2003 | Way et al. | |
| 2004/0052520 A1 * | 3/2004 | Halgren et al. | 398/5 |
| 2004/0052521 A1 * | 3/2004 | Halgren et al. | 398/19 |
| 2004/0151172 A1 * | 8/2004 | Notani et al. | 370/380 |
| 2006/0221811 A1 * | 10/2006 | Allasia et al. | 370/216 |

OTHER PUBLICATIONS

Medard et al. "Architecture Issues for Robust Optical Access", IEEE Communications Magazine, Jul. 2001, pp. 116-122.*
Fredrik Davik, et al., *Ethernet Transport Over Wide Area Networks—"IEEE 802.17 Resilient Packet Ring Tutorial"*, IEEE Communications Magazine, Mar. 2004, pp. 112-118.

* cited by examiner

*Primary Examiner* — Alpus H Hsu

(57) ABSTRACT

A method and system for provisioning a Resilient Packet Ring ("RPR") over a Wavelength Division Multiplexing ("WDM") network is disclosed. A plurality of stations send data packets to each other over a dual ring fiber optic link. The data packets travel over the dual ring fiber optic link at a unique wavelength to distinguish the different data packets. When one station of the plurality of stations detects a location of a failure in the WDM network, the station identifying the location of the failure either notifies all stations of the plurality of stations of the location of the failure or notifies only the stations of the plurality of stations abutting the location of the failure. If all stations of the plurality of stations are notified of the failure, all stations steer data packets sent towards the location of the failure away from the location of the failure. If only the stations abutting the location of the failure are notified, only the stations abutting the location of the failure wrap data packets sent towards the location of the failure away from the location of the failure.

14 Claims, 3 Drawing Sheets

RESILIENT PACKET RING PROTECTION OVER A WAVELENGTH DIVISION MULTIPLEXING NETWORK

BACKGROUND

Wavelength Division Multiplexing ("WDM") is a method of simultaneously transporting data from a plurality of sources over a single fiber optic link. To distinguish the data from the plurality of sources, data from each source travels over the single fiber optic link at a unique wavelength. Thus, WDM provides the ability to carry multiple sets of data over a single fiber optic link, instead of sending each set of data over its own fiber optic link.

Traditional WDM networks comprise a primary fiber optic link and a protection data path between each data source for each desired direction of data flow. Each primary fiber optic link and protection data path may only carry data packets traveling in one direction Thus, for two data sources to have the ability to pass data packets between each other, WDM networks require four fiber optic links. One set of a primary fiber optic link and a protection data path may carry data packets from a first data source to a second data source, and a second set of a primary fiber optic link and a protection data path may carry data packets from the second data source to the first data source.

During normal operation, the data from the plurality of sources travels over the primary fiber optic link. However, if a failure such as a break occurs in the primary fiber optic link, the data from the plurality of sources is routed to the protection data path. For critical applications where loss of the ability to transmit and receive data is absolutely necessary, protection is paramount. Providing a protection data path (for non-critical applications or for other applications which inherently possess the ability to protect data) for every connection between the plurality of sources within the WDM network is costly and inefficient.

DETAILED DESCRIPTION OF THE DRAWINGS AND THE PRESENTLY PREFERRED EMBODIMENTS

The preferred embodiments are directed to a Resilient Packet Ring ("RPR") network provisioned over a Wavelength Division Multiplexing ("WDM") network. RPR provides the ability to maintain communications between two sources of data within a WDM network when there is a failure in the primary fiber optic link between two data sources without providing costly, redundant connection.

Figure 1:
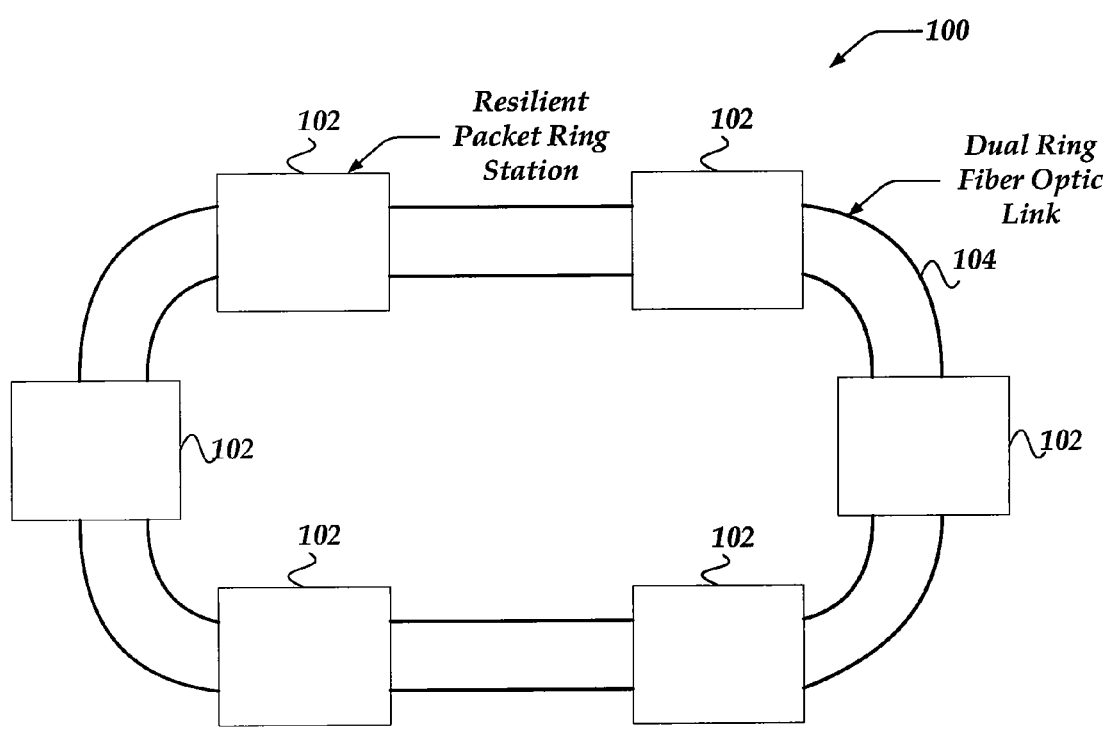
FIG. 1 is a diagram of an embodiment of a Resilient Packet Ring ("RPR") provisioned over a Wavelength Division Multiplexing ("WDM")

FIG. 1 is a diagram of one embodiment of a RPR network provisioned over a WDM network 100. Generally, the WDM network 100 comprises a plurality of stations 102 and a dual ring fiber optic link 104 which is in communication with each of the plurality of stations 102. Each section of the dual ring fiber optic link 104 between two stations 102 comprises a first primary fiber optic link for carrying data packets between stations 102 in one direction and a second primary fiber optic link for carrying data packets between stations 102 in another direction. Therefore, unlike traditional WDM networks, the WDM network 100 does not provide a redundant protection path for every section of fiber optic link 104 between two stations 102. A redundant protection path is not necessary due to the fact that the WDM network 100 may utilize the protection schemes of the RPR network provisioned over the WDM network 100.

Typically, each of the plurality of stations 102 is also a RPR station. However, in other embodiments, only a portion of the plurality of stations 102 are RPR stations. RPR is a data protocol and topology developed in the Institute of Electrical and Electronic Engineers ("IEEE") LAN/MAN Standards Committee and published as standard IEEE 802.17 for fiber optic rings.

During operation, the RPR establishes dual ringlets (or two paths) along the dual ring fiber optic link 104 to transmit one or more data packets originating from one or more of the plurality of stations 102. As in traditional WDM networks, multiple data packets from one or more stations 102 may travel over the dual ring fiber optic link 104 at unique wavelengths to distinguish the data packets. However, unlike traditional WDM networks which protect data packets through the use of a redundant protection path, the RPR provisioned over the WDM network inherently protects transmitted data packets through the use of RPR steering or RPR wrapping.

The RPR provides protection to data packets when there is a failure in the dual ring fiber optic link 104 such as a break or a failure in one of the plurality of station 102 by providing steering or wrapping at the location of the failure. Steering occurs when a station 102 sends a data packet to another station 102 around the dual ring fiber optic link 104 in a direction away from the site of the failure when the station 102 would normally send the packet to the other station 102 through the location of the failure. Wrapping occurs when a station 102 abutting a failure in the fiber optic link 104 sends the data packet in a direction away from the location of the failure to reach the desired station 102.

Figure 2:
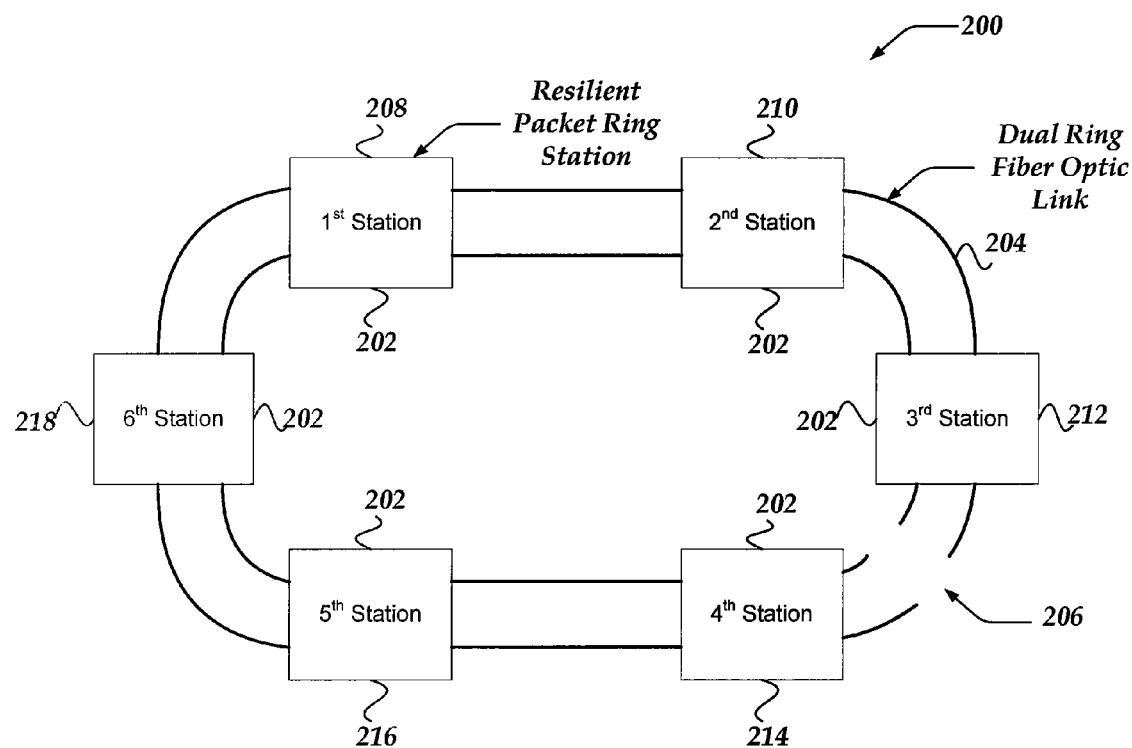
FIG. 2 is a diagram of one embodiment of a RPR network provisioned over a WDM ring utilizing RPR steering to avoid a failure in the fiber optic link.

FIG. 2 is a diagram of one embodiment of a RPR provisioned over a WDM network 200 which implements steering at a location of a failure 206. Generally, an illustrative WDM network 200 comprises a first station 208, a second station 210, a third station 212, a fourth station 214, a fifth station 216, and a sixth station 218. However, it will be appreciated that the WDM network 200 could comprise any number of stations. Each of the stations is in communication with the dual ring fiber optic link 204. In the illustrative WDM network 200, a failure 206 occurs at a section of fiber optic link 204 between the third and fourth stations 212, 214.

When the failure occurs, an internal protection service of a RPR station 202 detects the location of the failure 206 and notifies the other RPR stations 208, 210, 212, 214, 216, 218 of the location of the failure 206. Typically, RPR stations 202 send operations, administration, and maintenance ("OAM") messages between each other. One of the purposes of the OAM messages is to determine if a portion of the dual ring fiber optic link 204 is active between two stations 202.

For example, the third station 212 may send an OAM message to the adjacent fourth station 214. If the fourth station 214 does not acknowledge the OAM message after a predefined time period, the third station 212 determines that there is a failure 206 in the fiber optic link between the third and fourth stations 212, 214. In response to determining the location of the failure 206, the third station 212 sends an OAM message to the first, second, fourth, fifth, and sixth stations 208, 210, 214, 216, 218 notifying the stations of the location of the failure 206.

In response to the notification of the location of the failure 206, the first, second, third, fourth, fifth, and sixth stations 208, 210, 212, 214, 216, 218 steer future data packets to other stations away from the location of the failure 206. For example, if the second station 210 sends a data packet to the third station 212, the second station 210 sends the data packet directly to the third station 212. However, if the second station 210 sends a data packet to the fourth station 214, the second station 210 steers the data packet away from the location of the failure 206 between the third and fourth stations 212, 214 and sends the data packet to the fourth station 214 through the first, sixth, and fifth stations 208, 218, 216. Similarly, if the third station 212 sends a data packet to the fourth station 214, due to the location of the failure between the third and fourth station 212, 214, the third station 212 sends the data packet to the fourth station 214 through the second, first, sixth, and fifth stations 210, 208, 218, 216.

Typically, all of the stations 208, 210, 212, 214, 216, 218 will continue to steer the data packets away from the location of the failure 206 until an RPR station 202 adjacent to the location of the failure 206 notifies the stations 208, 210, 212, 214, 216, 218 that the failure 206 has been repaired. Generally, an RPR station 202 adjacent to the failure 206 determines that the failure has been repaired by periodically attempting to send an OAM message through the location of the failure 206 and waiting for the other RPR station 202 adjacent to the failure to acknowledge the OAM message. Once a RPR station 202 adjacent to the location of the failure 206 determines that the failure has been repaired, the RPR station 202 sends an OAM message to the other RPR stations 202 notifying the RPR stations 202 that the failure has been repaired.

Figure 3:
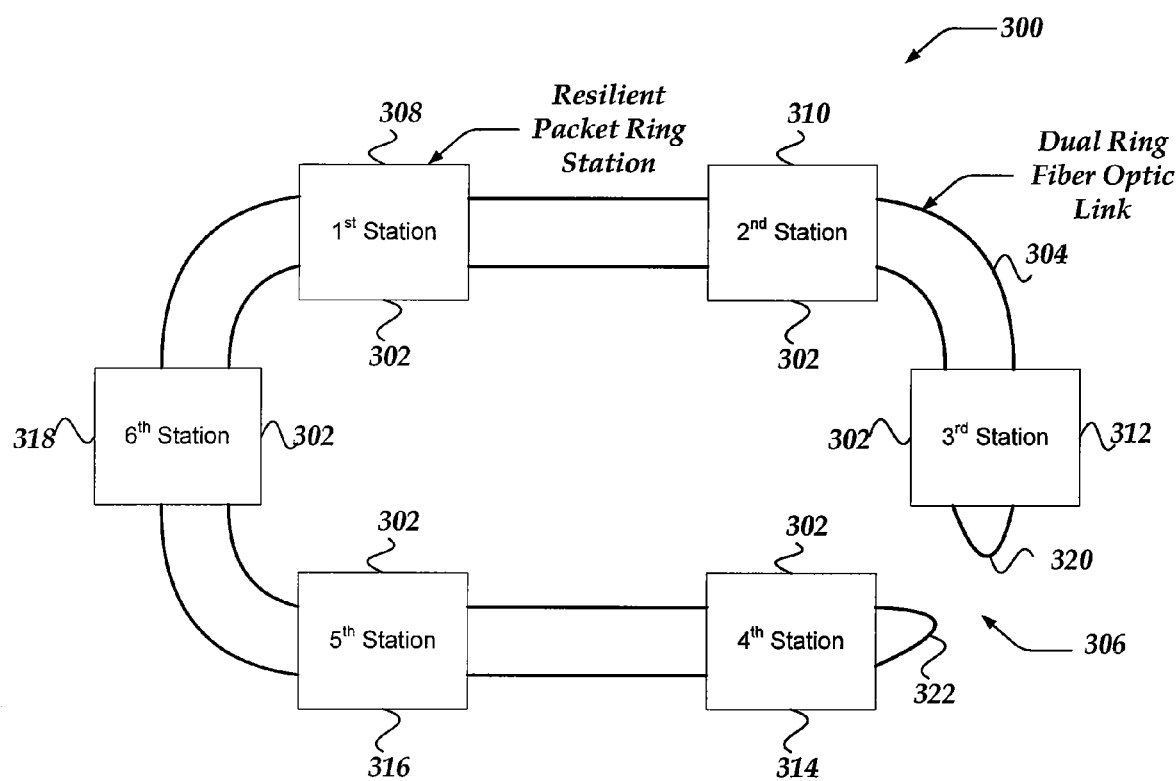
FIG. 3 is a diagram of one embodiment of a RPR network provisioned over a WDM ring utilizing RPR wrapping to avoid a failure in the fiber optic link.

FIG. 3 is a diagram of one embodiment of an RPR network provisioned over a WDM network 300 which implements wrapping at a location of a failure 306 of the dual ring fiber optic link 304 or a failure of one of the plurality of stations. Typically, a wrap is a logical operation performed by an RPR station 302 adjacent to the location of the failure 306. For example, an RPR station 302 adjacent to the location of the failure 306 may detect that a data packet is traveling towards the location of the failure 306 in one direction along the dual ring fiber optic link 304. In response, the RPR station 302 may edit the header file of the data packet and send the data packet away from the location of the failure 306 in a second direction, opposite to the first direction, along the dual ring fiber optic link 304.

Generally, an illustrative WDM network 300 comprises a first station 308, a second station 310, a third station 312, a fourth station 314, a fifth station 316, and a sixth station 318. However, it will be appreciated that the WDM network 300 could comprise any number of stations. Each of the stations is in communication with the dual ring fiber optic link 304. In the illustrative WDM network 300, a failure 306 occurs at a location of the dual ring fiber optic link 304 between the third station 312 and the fourth station 314.

When the failure 306 occurs, an internal protection system of a RPR station 302 adjacent to the failure 306 detects the location of the failure 306 as described above and notifies any other RPR stations 302 abutting the location of the failure 306. However, unlike in the RPR utilizing steering, the RPR station 302 does not notify any RPR station 302 not abutting the location of the failure 306. For example, if the third station 312 detects a failure 306 between the third and fourth stations 312, 314, the third station 312 sends an OAM message to the fourth station 314 to notify the fourth station 314 of the failure 306, but the third station 312 does not notify the first, second, fifth, and sixth stations 308, 310, 316, 318 of the location of the failure 306.

In response to the notification of the location of the failure 306, the third station 312 wraps the fiber optic link 304 at 320 and the fourth station wraps the fiber optic link 304 at 322. Due to the wraps at 320 and 322, any data packet sent in the direction of the location of the failure 306 from the third or fourth station 312, 314, will be wrapped in the opposite direction so that the data packet travels away from the location of the break 306 until the data packet reaches its intended station.

For example, if the second station 310 sends a data packet to the fourth station 314, the second station 310 sends the data packet along the fiber optic link 304 to the third station 312. At the third station 312, to avoid the location of the failure 306, the third station 312 wraps the data packet back through the second, first, sixth, and fifth stations 310, 308, 318, 316 to reach the fourth station 314. Similarly, if the sixth station 318 sends a data packet to the third station 312 through the fourth station 314, to avoid the location of the failure 306, the fourth station 314 wraps the data packet back through the fifth, sixth, first, and second stations 316, 318, 308, 310 to the third station 312. The third and fourth 312, 314 will continue to wrap data packets away from the location of the failure 306 until the third or fourth station 312, 314 determines the failure has been repaired as described above and notifies the other station.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories; or a signal containing computer instructions being sent from point A to point B. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Accordingly, the present invention contemplates a computer readable medium containing instructions, or that which receives and executes instructions from a propagated signal so that a device connected to a network environment can send or receive voice, video or data, and to communicate over the network using the instructions.

Additionally, it will be understood that a device of the present invention includes broadly any electronic device that provides voice, video or data communication, such as a telephone, a cordless telephone, a mobile phone, a cellular telephone, a Personal Digital Assistant (PDA), a set-top box, a computer, and/or a server.

It is therefore intended that the foregoing detailed description be regarded as illustrative rather than limiting, and that it be understood that it is the following claims, including all equivalents, that are intended to define the spirit and scope of this invention.

The invention claimed is:

1. A method for provisioning a Resilient Packet Ring ("RPR") over a Wavelength Division Multiplexing ("WDM") network comprising:
   sending data packets between a plurality of stations of the WDM network at substantially the same time over a dual ring fiber optic link, at least one data packet comprising a wavelength that is different from all other data packets sent between the plurality of station at substantially the same time;
   sending a first operations, administrative, and maintenance ("OAM") message from a first station of the plurality of stations to a second station of the plurality of the stations, the first station adjacent to the second station in the WDM network;
   detecting a location of a failure in the WDM network after a failure to receive an acknowledgement of the first OAM message at the first station from the second station after a predetermined period of time;
   sending a second OAM message from the first station to the other stations of the plurality of stations notifying the plurality of stations of the location of the failure in response to detecting the location of the failure;
   steering future data packets sent from one station of the plurality of stations of the WDM network to another station of the plurality of stations of the WDM network away from the location of the failure in response to receipt of the second OAM message;
   sending a third OAM message from the first station of the plurality of stations to the second station of the plurality of stations;
   determining that the failure has been repaired based on receipt of an acknowledgement of the third OAM message at the first station from the second station within a predetermined period of time;
   sending a fourth OAM message from the first station to the other stations of the plurality of stations notifying the plurality of stations that the failure has been repaired in response to determining that the failure has been repaired; and
   ceasing to steer future data packets sent between the plurality of stations away from the location of the repaired failure in response to receipt of the fourth OAM message.

2. The method of claim 1, wherein the failure is a failure in the dual ring fiber optic link connecting at least two of the plurality of stations.

3. The method of claim 1, wherein the failure is a failure at one of the plurality of stations.

4. A Resilient Packet Ring ("RDR") provisioned over a Wavelength Division Multiplexing ("WDM") network comprising:
   a dual ring fiber optic link; and
   a plurality of stations coupled with the dual ring fiber optic link, each of the plurality of stations in communication with the other plurality of stations via the dual ring fiber optic link to exchange data packets;
   wherein a first station of the plurality of stations that is adjacent to a second station of the plurality of stations in the WDM network is operative to send a first operations, administrative, and maintenance ("OAM") message to the second station, to detect a location of a failure in the WDM network when an acknowledgement of the first OAM message is not received from the second station within a predetermined period of time, and to send a second OAM message to the other stations of the plurality of stations to notify the other stations of the plurality of stations of the location of the failure;
   wherein in response to receipt of the second OAM message to notify the stations of the location of the failure, each of the plurality of stations of the WDM network is operative to steer data packets away from the location of the failure;
   wherein the first station is operative to send a third OA message to the second station, to determine that the failure has been repaired when an acknowledgement of the third OA message is received at the first station within a predetermined period of time, and to send a fourth OAM message to the other stations of the plurality of stations to notify the other stations that the failure has been repaired;
   wherein in response to receipt of the fourth OAM message to notify the stations that the failure has been repaired, each of the plurality of stations of the WDM network is operative to cease steering data packets away from the location of the failure; and
   wherein each of the plurality of stations is operative to send data packets to another of the plurality of stations via the dual ring fiber optic link at substantially the same time, each data packet sent to another of the plurality of stations at substantially the same time comprising a unique wavelength.

5. The RPR provisioned over a WDM network of claim 4, wherein the failure is a failure in a section of the dual ring fiber optic link connecting at least two of the plurality of stations.

6. The RPR provisioned over a WDM network of claim 4, wherein the failure is a failure in one of the plurality of stations.

7. A method for provisioning a Resilient Packet Ring ("RPR") over a Wavelength Division Multiplexing ("WDM") network comprising:
   sending data packets between a plurality of stations a WDM network at substantially the same time over a dual ring fiber optic link, at least one data packet comprising a wavelength that is different from all other data packets sent between the plurality of stations at substantially the same time;
   sending a first operations, administrative, and maintenance ("OAM") message from a first station of the plurality of stations to a second station of the plurality of stations, the first station adjacent to the second station in the WDM network;
   detecting a location of a failure in the WDM network after a failure to receive an acknowledgement of the first OAM message at the first station from the second station after a predetermined period of time;

sending a second OAM message from the first station to the other stations of the plurality of stations abutting the location of the failure indicating the location of the failure;

sending a data packet sent towards the location of the failure away from the location of the failure, at a station of the WDM network abutting the location of the failure, in response to receipt of the second OAM message;

sending a third OAM message from the first station to the second station;

determining the failure has been repaired after receiving an acknowledgement of the third OAM message from the second station at the first station within a predetermined period of time;

sending a fourth OAM message from the first station to the other stations of the plurality of stations abutting the location of the failure indicating the failure has been repaired; and ceasing to send data packets sent towards the location of the failure away from the location of the repaired failure, at a station of the WDM network abutting the location of the repaired failure, in response to receipt of the fourth OAM message.

8. The method of claim 7 wherein the failure is a failure in a section of the fiber optic link connecting at least two stations of the plurality of stations.

9. The method of claim 7 wherein the failure is a failure in one of the stations of the plurality of stations.

10. A Resilient Packet Ring ("RPR") provisioned over a Wavelength Division Multiplexing ("WDM") network comprising:

a dual ring fiber optic link;

a plurality of stations coupled with the dual ring fiber optic link, each of the plurality of stations in communication with the other plurality of stations via the dual ring fiber optic link to exchange data packets;

wherein a first station of the plurality of stations that is adjacent to a second station of the plurality of stations is operative to send a first operations, administrative, and maintenance ("OAM") message to the second station, to detect a location of a failure in the WDM network when an acknowledgement of the first OAM message is not received from the second station within a predetermined period of time, and to send a second OAM message to notify the stations of the plurality of stations abutting the location of the failure of the failure;

wherein in response to the second OAM message, the stations abutting the location of the failure are operative to wrap data packets sent towards the location of the failure away from the location of the failure;

wherein the first station is operative to send a third OAM message to the second station, to determine that the failure has been repaired when an acknowledgement of the third OAM message is received from the second station within a predetermined period of time; and to send a fourth OAM message to the stations of the plurality of stations abutting the location of the failure to notify the stations that the failure has been repaired;

wherein in response to the fourth OAM message, the stations abutting the location of the repaired failure are operative to cease wrapping data packets sent towards the location of the repaired failure away from the location of the repaired failure; and wherein each of the plurality of stations is operative to send data packets to another of the plurality of stations via the dual ring fiber optic link at substantially the same time, each data packet sent to another of the plurality of stations at substantially the same time comprising a unique wavelength.

11. The RPR provisioned over a WDM network of claim 10 wherein the failure is a failure in a section of the dual ring fiber optic link connection at least two stations of the plurality of stations.

12. The RPR provisioned over a WDM network of claim 10 wherein the failure is a failure in one of the stations of the plurality of stations.

13. A non-transitory computer-readable storage medium comprising a set of instructions for provisioning a Resilient Packet Ring ("RPR") over a Wavelength Division Multiplexing ("WDM") network, the set of instructions to direct a processor to perform acts of:

sending data packets between a plurality of stations of the WDM network at substantially the same time over a dual ring fiber optic link, at least one data packet comprising a wavelength that is different from all other data packets sent between the plurality of station at substantially the same time;

sending a first operations, administrative, and maintenance ("OAM") message from a first station of the plurality of stations to a second station of the plurality of the stations, the first station adjacent to the second station in the WDM network;

detecting a location of a failure in the WDM network after a failure to receive an acknowledgement of the first OAM message at the first station from the second station after a predetermined period of time;

sending a second OAM message from the first station to the other stations of the plurality of stations notifying the plurality of stations of the location of the failure;

steering future data packets sent from one station of the plurality of stations of the WDM network to another station of the plurality of stations of the WDM network away from the location of the failure in response to receipt of the second OAM message;

sending a third OAM message from the first station of the plurality of stations to the second station of the plurality of stations;

determining that the failure has been repaired based on receipt of an acknowledgement of the third OAM message at the first station from the second station within a predetermined period of time;

sending a fourth OAM message from the first station to the other stations of the plurality of stations notifying the plurality of stations that the failure has been repaired; and ceasing to steer future data packets sent between the plurality of stations away from the location of the failure in response to receipt of the fourth OAM message.

14. A non-transitory computer-readable storage medium comprising a set of instructions for provisioning a Resilient Packet Ring ("RPR") over a Wavelength Division Multiplexing ("WDM") network, the set of instructions to direct a processor to perform acts of:

sending data packets between a plurality of stations a WDM network at substantially the same time over a dual ring fiber optic link, at least one data packet comprising a wavelength that is different from all other data packets sent between the plurality of stations at substantially the same time;

sending a first operations, administrative, and maintenance ("OAM") message from a first station of the plurality of stations to a second station of the plurality of stations, the first station adjacent to the second station in the WDM network;

detecting a location of a failure in the WDM network after a failure to receive an acknowledgement of the first OAM message at the first station from the second station after a predetermined period of time;

sending a second OAM message from the first station to the other stations of the plurality of stations abutting the location of the failure indicating the location of the failure;

sending a data packet sent towards the location of the failure away from the location of the failure, at a station of the WDM network abutting the location of the failure, in response to receipt of the second OAM message;

sending a third OAM message from the first station to the second station;

determining the failure has been repaired after receiving an acknowledgement of the third OAM message at the first station from the second station within a predetermined period of time;

sending a fourth OAM message from the first station to the other stations of the plurality of stations abutting the location of the failure indicating the failure has been repaired; and ceasing to send data packets sent towards the location of the failure away from the location of the repaired failure at a station of the WDM network abutting the location of the repaired failure in response to receiving the fourth OAM message.

\* \* \* \* \*